Aug. 29, 1933.  A. LINDNER  1,924,742
CLAMPING DEVICE
Filed Dec. 19, 1930  2 Sheets-Sheet 1

INVENTOR.
Arthur Lindner
BY
Allen & Allen
ATTORNEYS

Aug. 29, 1933.                A. LINDNER                 1,924,742
                            CLAMPING DEVICE
                       Filed Dec. 19, 1930        2 Sheets-Sheet 2

INVENTOR.
BY Arthur Lindner
ATTORNEYS

Patented Aug. 29, 1933

1,924,742

UNITED STATES PATENT OFFICE 1,924,742

CLAMPING DEVICE

Arthur Lindner, Cincinnati, Ohio, assignor to The Lindner Manufacturing Company, Lockland, Ohio, a corporation of Ohio Application December 19, 1930
Serial No. 503,518

6 Claims. (Cl. 90—59)

My invention relates to clamping devices and particularly to a novel type of clamping device which is particularly effective for clamping work on the tables of machine tools, in which the tables are provided with T-slots for receiving clamping bolts.

It is an object of my invention to provide in combination with a relatively fixed clamping member, for a movable clamping member in which clamping pressure is applied along a line extending diagonally downwardly toward the base on which the clamped work is supported.

It is a further object of my invention to provide in combination with a relatively fixed clamping member, for an adjustable clamping member, actuable by a toggle mechanism which becomes more effective in its clamping action as the links of the toggle become straightened out.

It is thus an object of my invention to provide a clamping mechanism preferably effected by a simple adjustment, as the turning of a nut, in which as the nut or other clamp actuating mechanism is adjusted a proportionately increased clamping pressure is obtained.

Another object of my invention is the provision of a clamp which will be readily adjustable and available for use in the T-slots in the tables of machine tools, such as milling machines, planers and the like.

The above objects and other structural advantages and improvements which will be hereinafter described, I accomplish by that certain combination and arrangement of parts, of which I have shown a preferred modification.

Referring to the drawings:—

Figure 1:
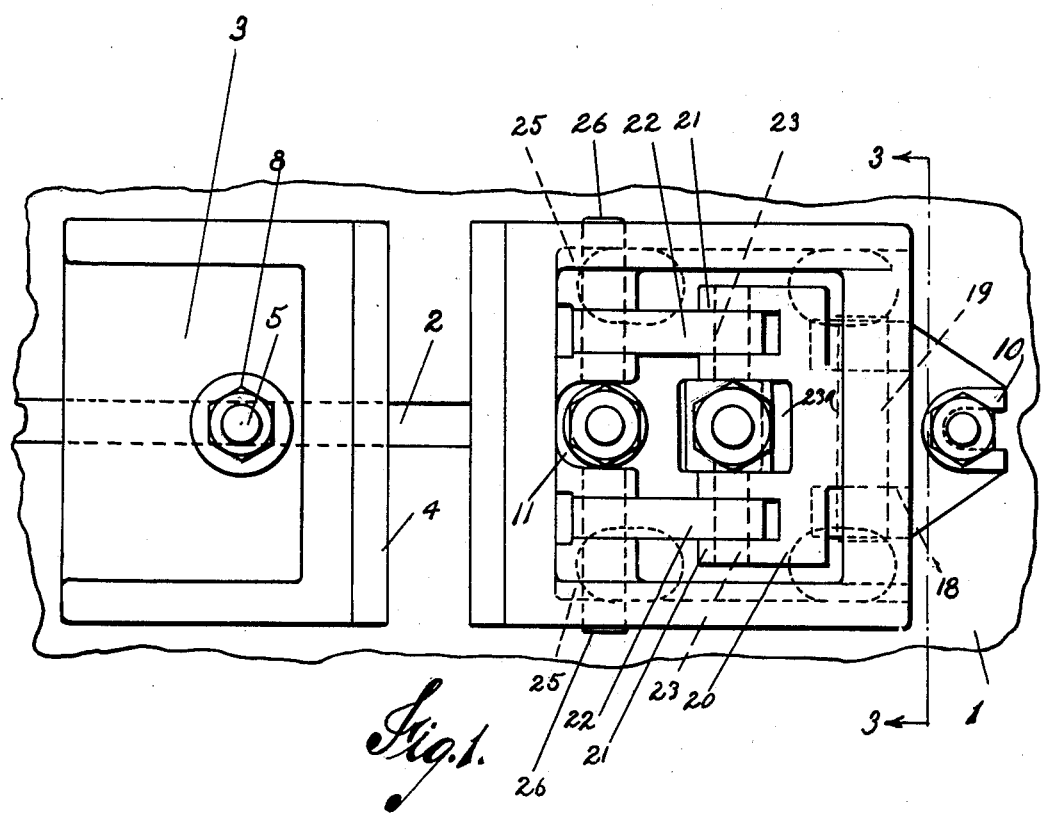
Figure 1 is a plan view of my preferred type of clamping mechanism.

In the Figures I have shown a base 1 which is ordinarily the movable table of a machine tool and is provided with T-slots 2 for the reception of clamping bolts.

One of the clamping members generally indicated at 3 is shown as an L-shaped member having a clamping face 4 and with a bolt 5 passing through a hole 6 in the base of the L-shaped clamp. The head 7 of the bolt binds against the inturned flanges of the T-slot, and a nut 8 is employed for securely holding this clamping member in position.

The adjustable clamping member is formed by a base 9, which is provided with bosses 10 and 11, which are secured either to the table of a machine tool or to any type of slotted support. Bolts 12, 13, having heads 14, 15, extend through the bosses 10, 11, and nuts 16, 17, are employed to hold the base 9 firmly in position on the base plate, whether the base plate is a table of a machine tool provided with slots or a channeled base plate.

Extending up from the base 9 there are bosses 18 which are spaced and which journal the pivot pin 19 of the toggle arm 20. The toggle arm is composed of right and left pieces secured together. The toggle arm 20 has forward extensions which are bifurcated at 21, 21, and toggle links 22, 22, are pivoted in the bifurcated portions of the arm 20 by means of pivot pins 23, 23, which are trunnions extending out from a trunnion block 23a.

The adjustable clamp has a face 24, and side rails 25 extend back from the adjustable face and pivot pins 26 are journaled in said rails to provide pivotal connections with the toggle links 22.

Figure 3:
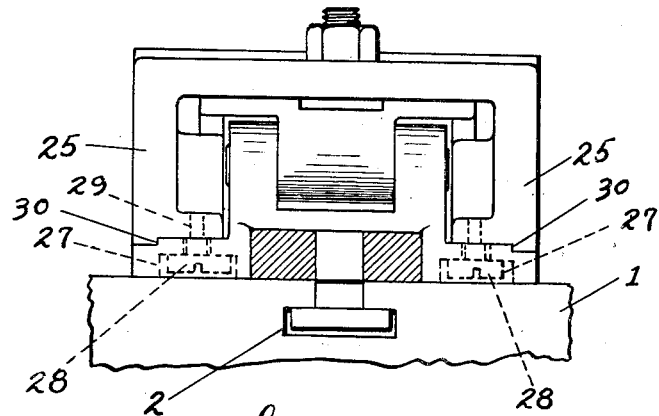
Figure 3 is a sectional view of Figure 1 taken on the line 3—3.

The base 9 is provided with recessed slotted portions 27 which permit the heads 28 of the studs 29 to slide through a limited range of movement in the base plates. Referring to Figure 3, it will be noted that the side bars 25 which extend back from the clamping face 24, slide in channeled tracks 30 at the sides of the base 9.

Figure 2:
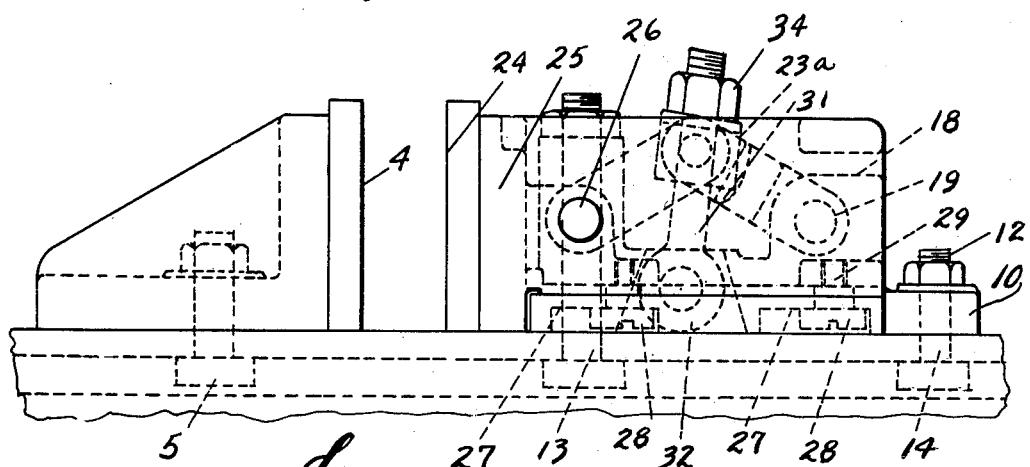
Figure 2 is a side elevation of the clamp shown in Figure 1.
Figure 4:
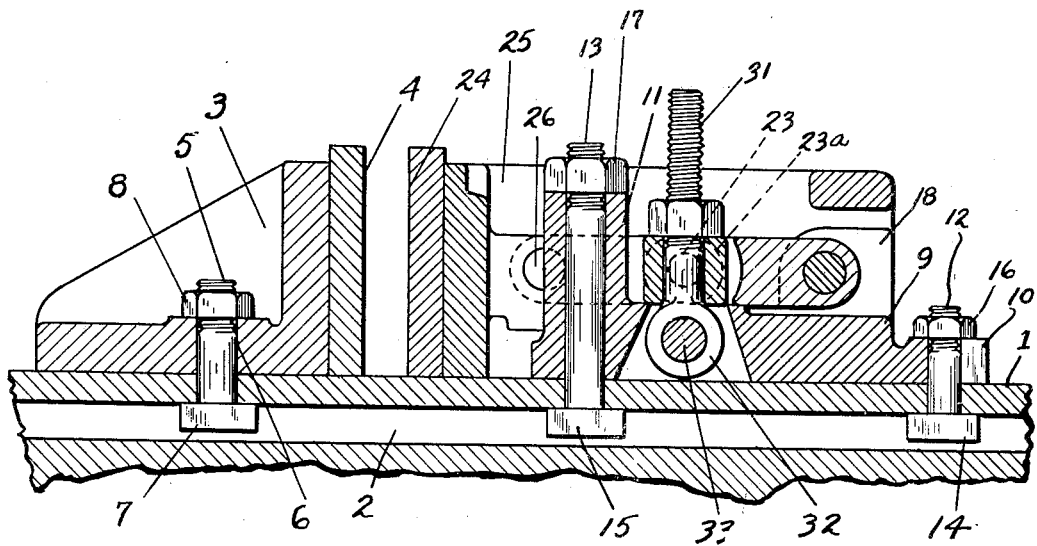
Figure 4 is a vertical sectional view of the mechanism.

The clamping members may be mounted in suitable position relative to work to be held on the table of a machine tool, and the bolts 5, 12 and 13 tightened down. Before the clamping pressure is applied, the toggle links will be in a position indicated in Figure 2, and after the clamping pressure is applied the limit of movement of the adjustable clamp is indicated in Figure 4. A clamping bolt 31 having an eye head 32 is pivoted in a pivot pin 33, extending across between bosses in the base 9. The bolt 31 passes through the trunnion block 23a. As the nut 34 on the clamp bolt is tightened down, the trunnion block actuates the toggle links which straighten out, thereby advancing the clamping face 24 to tightly engage the work being clamped. Since the toggle lengths 22 extend diagonally downward toward their pivotal mounting 26, pressure is applied to the clamping face 24 along a line extending downwardly, so that there is no tendency for the clamping faces 24 to be forced upward.

Having thus described my invention, what I claim as new and desire to secure by Letters Patent, is:—

1. A clamping device comprising a base provided with means for fixing said base to a support having a clamping jaw fixed thereon, a second clamping jaw, a housing carrying said second clamping jaw, said housing and said base having mutually engaging side portions, whereby said second jaw is guided on said base, means for holding said housing down on said base for sliding, a bolt having its lower end pivoted in said base, a member movable up and down on said bolt, a nut on said bolt to move said member downward, a link pivoted to said member and to said base, and a link pivoted to said member and to said housing, said links forming a toggle.

2. A clamping device comprising a base provided with means for fixing said base to a support having a clamping jaw fixed thereon, a second clamping jaw, a housing carrying said second clamping jaw, said housing and said base having mutually engaging side portions, whereby said second jaw is guided on said base, means for holding said housing down on said base for sliding, a bolt having its lower end pivoted in said base, a member movable up and down on said bolt, a nut on said bolt to move said member downward, a link pivoted to said member and to said base, a link pivoted to said member and to said housing, said links forming a toggle, the means for holding said housing down on said base comprising screws, and the base having elongated openings and recesses and the screws passing through the elongated openings into the housing and having their heads in said recesses.

3. A clamping device comprising a base provided with means for fixing said base to a support having a clamping jaw fixed thereon, a second clamping jaw, a housing carrying said second clamping jaw, said housing and said base having mutually engaging side portions, whereby said second jaw is guided on said base, means for holding said housing down on said base for sliding, a bolt having lateral trunnions, a bifurcated link straddling said member and pivoted on said trunnions, and having an end pivoted to said base and links pivoted on the respective trunnions and pivoted to said housing, said links forming a toggle.

4. A clamping device comprising a base provided with means for fixing said base to a support having a clamping jaw fixed thereon, a second clamping jaw, a housing carrying said second clamping jaw, said housing and said base having mutually engaging side portions, whereby said second jaw is guided on said base, means for holding said housing down on said base for sliding, a bolt having lateral trunnions, a bifurcated link straddling said member and pivoted on said trunnions, and having an end pivoted to said base and links pivoted on the respective trunnions and pivoted to said housing, said links forming a toggle, the means for fixing the base to the support comprising a bolt between the links that are pivoted to the housing.

5. A clamping device comprising a base provided with means for fixing said base to a support having a clamping jaw fixed thereon, a second clamping jaw, a housing carrying said second clamping jaw, said housing and said base having mutually engaging side portions, whereby said second jaw is guided on said base, means for holding said housing down on said base for sliding, a bolt having lateral trunnions, a bifurcated link straddling said member and pivoted on said trunnions, and having an end pivoted to said base and links pivoted on the respective trunnions and pivoted to said housing, said links forming a toggle, each straddling part of the bifurcated link being bifurcated and straddling a respective one of the links that is pivoted to said housing.

6. A clamping device comprising a base provided with means for fixing said base to a support, a work engaging element having engagement with said base throughout the major part of the length of the base for guiding said work engaging element on said base, a bolt having its lower end pivoted on said base, a member movable up and down on said bolt, a nut on said bolt for moving said member downward, a link pivoted to said member and to said base within one end of the base, and a second link pivoted to said member and engaging said work engaging element within the other end of the base, said links forming a toggle.

ARTHUR LINDNER.